US009990428B2

(12) United States Patent
Anand et al.

(10) Patent No.: US 9,990,428 B2
(45) Date of Patent: Jun. 5, 2018

(54) COMPUTERIZED IDENTIFICATION OF APP SEARCH FUNCTIONALITY FOR SEARCH ENGINE ACCESS

(71) Applicant: Samsung Electronics Co., Ltd., Suwon-si, Gyeonggi-do (KR)

(72) Inventors: Saswat Anand, Los Altos, CA (US); Kalyan Desineni, Mountain View, CA (US); Manikandan Sankaranarasimhan, Hayward, CA (US); Danny Tsechansky, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/245,261

(22) Filed: Aug. 24, 2016

(65) Prior Publication Data
US 2017/0185679 A1   Jun. 29, 2017

Related U.S. Application Data

(63) Continuation of application No. 14/982,192, filed on Dec. 29, 2015.

(51) Int. Cl.
*G06F 17/30* (2006.01)

(52) U.S. Cl.
CPC .. *G06F 17/30864* (2013.01); *G06F 17/30554* (2013.01); *G06F 17/30867* (2013.01);
(Continued)

(58) Field of Classification Search
CPC .......... G06F 17/30864; G06F 17/3089; G06F 17/30126; G06F 17/30528; G06F 17/3053; G06F 17/30867
(Continued)

(56) References Cited

U.S. PATENT DOCUMENTS 8,145,521 B2 *  3/2012  Sah .................. G06Q 30/02
                                                  705/14.53
8,595,186 B1 * 11/2013  Mandyam ............. G06F 8/38
                                                   707/632
(Continued)

OTHER PUBLICATIONS

Hao, Shuai et al. "PUMA". Proceedings of the 12th annual international conference on Mobile systems, applications, and services—MobiSys 2014, 14 pages.
(Continued)

*Primary Examiner* — Dangelino N Gortayo
(74) *Attorney, Agent, or Firm* — Jefferson IP Law, LLP

(57) ABSTRACT

A search system includes a device controller that provisions a device to execute a copy of a selected mobile application. A crawler extracts content and metadata from states of the selected mobile application. A search input state classifier identifies search input states within the states based on a first set of heuristics, including recognition of user-visible search indicia and recognition of metadata that correlates with search functionality. A parameter identifier identifies, for each of the search input states, necessary input parameters. A search function data store stores a record for each identified search function. Each record includes a path to reach a corresponding search input state, an indication of required input parameters, and a mapping of the input parameters to user interface widgets. A query processing system uses the stored search functions to scrape content from the selected mobile application in response to a query.

20 Claims, 10 Drawing Sheets

(52) U.S. Cl.
CPC .... *G06F 17/30914* (2013.01); *G06F 17/3087* (2013.01); *G06F 17/30879* (2013.01)

(58) Field of Classification Search
USPC ....... 707/706, 733, 734, 726, 728, 731, 752, 707/755, 766, 912, 632, 709
See application file for complete search history.

(56) References Cited

U.S. PATENT DOCUMENTS

| | | | |
|---|---|---|---|
| 8,630,994 B2* | 1/2014 | Greene | G06F 17/30126 |
| | | | 707/706 |
| 8,694,496 B2* | 4/2014 | Erickson | G06F 17/30867 |
| | | | 707/732 |
| 9,177,058 B2* | 11/2015 | Camelo | G06F 17/30861 |
| 9,318,108 B2* | 4/2016 | Gruber | G10L 15/1815 |
| 2008/0134138 A1 | 6/2008 | Chamieh et al. | |
| 2009/0013307 A1 | 1/2009 | Raghavan et al. | |
| 2012/0278793 A1 | 11/2012 | Jalan et al. | |
| 2013/0346382 A1* | 12/2013 | Varthakavi | G06F 17/3089 |
| | | | 707/706 |
| 2014/0006129 A1* | 1/2014 | Heath | G06Q 30/0222 |
| | | | 705/14.23 |
| 2016/0027045 A1* | 1/2016 | Kurian | G06F 17/30528 |
| | | | 705/14.49 |
| 2016/0179956 A1 | 6/2016 | Sogani et al. | |
| 2016/0335286 A1 | 11/2016 | Desineni et al. | |
| 2016/0335333 A1 | 11/2016 | Desineni et al. | |
| 2016/0335348 A1 | 11/2016 | Desineni et al. | |
| 2016/0335349 A1 | 11/2016 | Desineni et al. | |
| 2016/0335356 A1 | 11/2016 | Desineni et al. | |
| 2017/0083606 A1 | 3/2017 | Mohan | |
| 2017/0116339 A1 | 4/2017 | Stein et al. | |
| 2017/0185677 A1 | 6/2017 | Anand et al. | |
| 2017/0185679 A1 | 6/2017 | Anand et al. | |

OTHER PUBLICATIONS

Lin, Felix et al. "SPADE: Scalable App Digging with Binary Instrumentation and Automated Execution," 2013, 12 pages.

Nath, Suman et al., "App Crawler: Opening Mobile App Black Boxes," 2012, 3 pages.

* cited by examiner

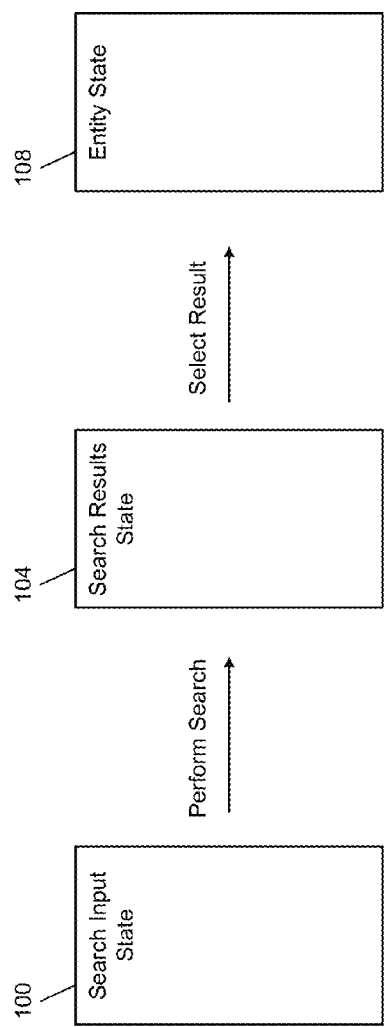
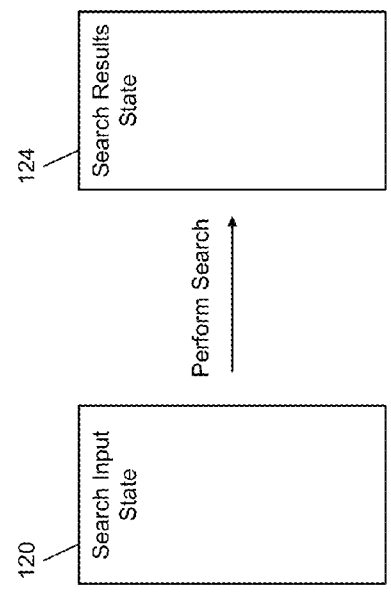
FIG. 1A
Prior Art
FIG. 1B
Prior Art

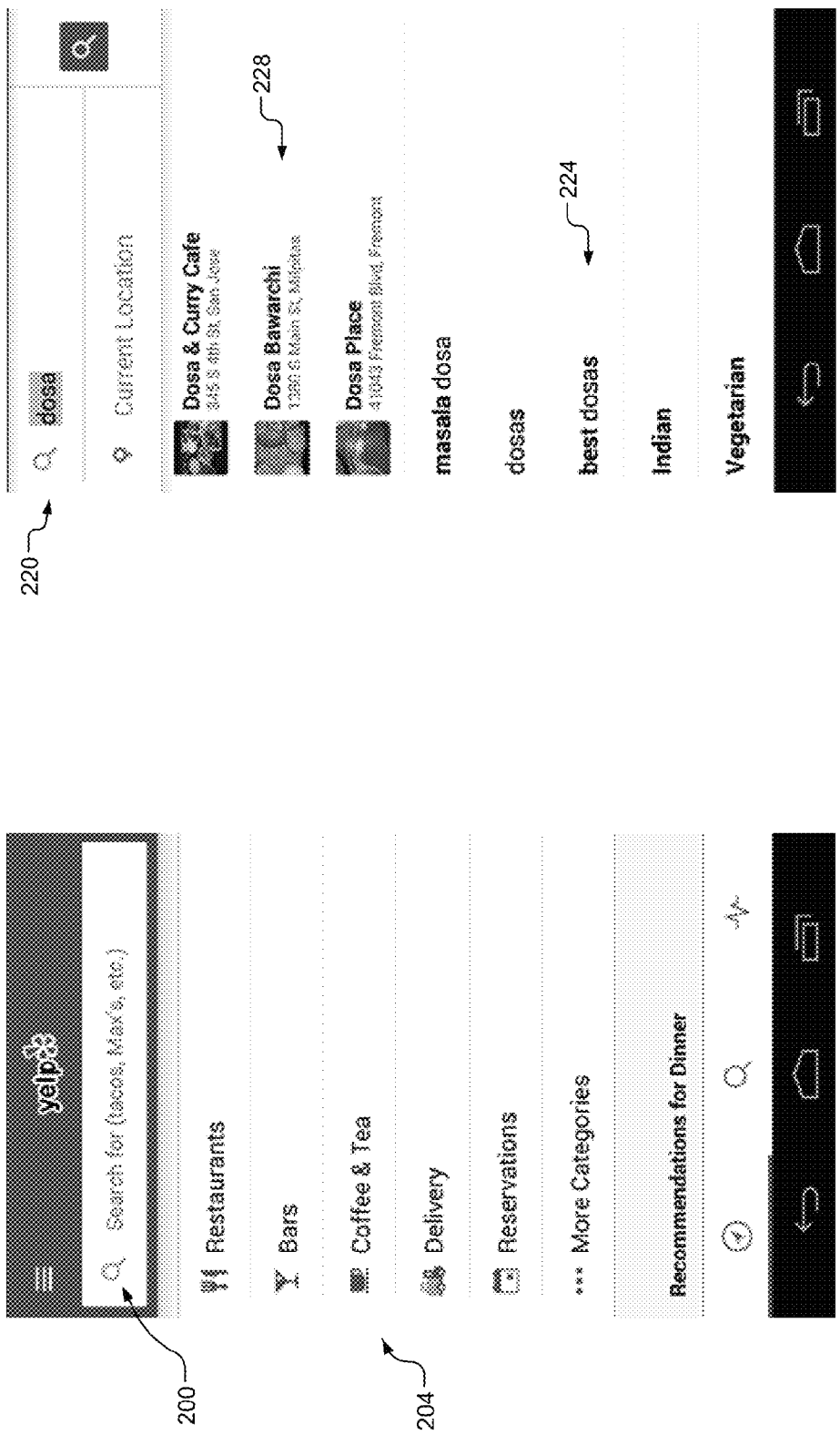

COMPUTERIZED IDENTIFICATION OF APP SEARCH FUNCTIONALITY FOR SEARCH ENGINE ACCESS

CROSS-REFERENCE TO RELATED APPLICATIONS

The present application is a continuation of U.S. patent application Ser. No. 14/982,192 filed on Dec. 29, 2015. The entire disclosure of the application referenced above is incorporated by reference.

FIELD

The present disclosure relates to mobile search systems and more particularly to characterizing mobile app search functionality.

BACKGROUND

Search engines are an integral part of today's electronic world. A search engine is generally powered by a collection of search indices. A search index may associate key words or combinations of key words to particular locations (such as web pages) containing, or related to, those key words. In order to generate and maintain these search indices, search engines often use crawlers to find and identify documents, and extract information from the documents. A web crawler requests a document (a web page) from the web server and indexes key words in the document. Web page metadata and heuristics may allow the crawler to recognize the importance or semantic meaning of various aspects of the document.

As the world transitions to more and more content being available through mobile platforms and some content only being available through mobile platforms, search engines increasingly rely on content from applications and not just content from web pages. However, with the wide variety of applications, and the nearly infinite ways in which content can be assembled and presented in these apps, recognizing and interpreting data from the apps is very difficult for a search engine.

Many apps themselves have internal search functionality. This functionality may be represented as shown in FIG. 1A, with the user beginning at a search input state (or, screen) 100 of a mobile application (equivalently, app). When the user performs a search from the search input state 100, a search results state 104 will be presented to the user with the results related to that search.

One of the search results may be selected, leading to an entity state. For example, as shown in FIG. 3, a set of results for a query of "thai" is shown. If one of those results is selected, an entity state relating to that result will be shown. An entity is essentially a noun and, in this context, generally refers to one of the discreet elements that the mobile app has knowledge of. For example, for a restaurant reviews app, the entities may include restaurants, cuisines, and specific dishes. For a movie showtimes app, the entities may include movie theaters and movies.

In FIG. 1B, a search input state 120, which may be the same as or different than the search input state 100, may allow a user to perform a search that leads to a search results state 124 having no corresponding entity states. As an example, see FIG. 4, where a single result for the weather at a given location is presented.

In FIG. 2A, an example home screen for the YELP restaurant app is shown. A text box 200 allows a user to type in a query and shows a hint of what text should be supplied.

Once the user begins typing into the text box 200, the hint may disappear. The hint is identified by being a lighter shade of color compared to the color of input text (in this case, gray instead of black).

Canned searches, such as restaurants, bars, and coffee & tea, are shown at 204. A canned search allows a user to perform a predefined search rather than typing the query into the text box 200. Further, the canned search may be restricted to certain types of metadata. For example, typing the word "coffee" into the text box 200 may perform a search across multiple fields of restaurant data, including reviews and textual descriptions. So a full-text search may return restaurants that simply serve coffee, such as when coffee had been mentioned in one of the reviews of the restaurant. Meanwhile, a canned search for coffee may return only those establishments that have been classified as coffee shops.

In FIG. 2B, a query is entered in a text box 220, and the app provides potential autocomplete text 224, as well as instant results 228 that are relevant to what has been typed so far into the text box 220.

In FIG. 3, a search results state is shown for a query of "thai" and includes advertisements 240 as well as organic search results 244. Selecting (such as with a single tap) one of the results may lead to an entity state that displays additional information about the corresponding restaurant. In FIG. 4, a search results state includes only a single search result, which is the weather for a specific location (shown as Los Altos, Calif.).

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A search system includes a device controller configured to provision a device to execute a selected mobile application. The search system includes a crawler configured to extract content and metadata from a plurality of states of the copy of the selected mobile application using the device. The search system includes a search input state classifier configured to identify search input states within the plurality of states based on a first set of heuristics. The first set of heuristics includes recognition of user-visible search indicia and recognition of metadata that correlates with search functionality. The search system includes a parameter identifier configured to identify, for each of the search input states, necessary input parameters. The search system includes a search function data store configured to store a record for each identified search function in the selected mobile application. Each record includes a path to reach a search input state of the corresponding search function, an indication of input parameters required to be supplied to the corresponding search function, and a mapping of the input parameters to user interface widgets of the search input state. The search system includes a query processing system configured to, in response to a query, (i) selectively perform the search function in the selected mobile application using parameters specified by the query, (ii) scrape content from a resulting search results state, and (iii) present the scraped content to a user.

In other features, the search system includes a search results state classifier configured to identify search results states within the plurality of states based on a second set of heuristics. The second set of heuristics includes identification of a list of repeated widget groups. In other features, the search input state classifier is configured to identify a precursor state to the identified search results states and store the precursor state as a search input state. In other features, the search system includes an operator interface configured to allow an operator to designate a state of the selected mobile application as a search results state. The search input state classifier is configured to identify a precursor state to the operator-designated search results state and store the precursor state as a search input state.

In other features, the user-visible search indicia includes a textual hint. The user-visible search indicia includes a search-specific keyboard. The metadata that correlates with search functionality includes a search-specific widget type. The metadata that correlates with search functionality includes an accessibility tag. In other features, the crawler is configured to (i) randomly select user interface elements within the selected mobile application for actuation and (ii) extract content and metadata from each state encountered as a result of the actuation of the randomly-selected user interface elements.

In other features, the parameter identifier is configured to gather autocomplete data from text input fields by supplying letters and numbers and scraping autocomplete suggestions. In other features, the device comprises one of an emulator configured to execute an operating system on emulated hardware and a simulator configured to simulate interaction of the operating system with the selected mobile application. The operating system is selected based on an operating system the selected mobile application was compiled for. In other features, the search system includes a digital distribution platform interface configured to download the selected mobile application from a digital distribution platform.

In other features, the query processing system includes a user interest finder configured to receive a query from a user device and identify a set of entity types to describe segments of the query. A search function matcher is configured to identify at least one search function from the search function data store. Each of the at least one search function has a set of required input entity types that is a subset of the identified set of entity types. A first search function of the at least one search function is associated with a first search input state of a first application. A live scrape system is configured to execute the first application within a device, navigate to the first search input state, supply parameters to the first search input state based on the query, perform a search, and scrape results from a resulting search results state. A results module is configured to assemble results from the live scrape system for each of the at least one search function and transmit the assembled results to the user device.

A method of operating a search system includes provisioning a device to execute a copy of a selected mobile application. The method includes extracting content and metadata from a plurality of states of the copy of the selected mobile application executing on the device. The method includes identifying search input states within the plurality of states based on a first set of heuristics. The first set of heuristics includes recognition of user-visible search indicia and recognition of metadata that correlates with search functionality. The method includes identifying, for each of the search input states, necessary input parameters. The method includes storing a record for each identified search function in the selected mobile application. Each record includes a path to reach a search input state of the corresponding search function, an indication of input parameters required to be supplied to the corresponding search function, and a mapping of the input parameters to user interface widgets of the search input state. The method includes, in response to a query, (i) selectively performing the search function in the selected mobile application using parameters specified by the query, (ii) scraping content from a resulting search results state, and (iii) presenting the scraped content to a user.

In other features, the method includes identifying search results states within the plurality of states based on a second set of heuristics. The second set of heuristics includes identification of a list of repeated widget groups. In other features, the method includes identifying a precursor state to the identified search results states. The method includes storing the precursor state as a search input state. In other features, the method includes allowing an operator to designate a state of the selected mobile application as a search results state. The method includes identifying a precursor state to the operator-designated search results state. The method includes storing the precursor state as a search input state.

In other features, the user-visible search indicia includes a textual hint. The user-visible search indicia includes a search-specific keyboard. The metadata that correlates with search functionality includes a search-specific widget type. The metadata that correlates with search functionality includes an accessibility tag. In other features, the method includes randomly selecting user interface elements within the selected mobile application for actuation. The method includes extracting content and metadata from each state encountered as a result of the actuation of the randomly-selected user interface elements.

In other features, the method includes gathering autocomplete data from text input fields by supplying letters and numbers and scraping autocomplete suggestions. In other features, the device comprises one of an emulator configured to execute an operating system on emulated hardware and a simulator configured to simulate interaction of the operating system with the selected mobile application. The operating system is selected based on an operating system the selected mobile application was compiled for. In other features, the method includes downloading the selected mobile application from a digital distribution platform.

In other features, the method includes receiving a query from a user device. The method includes identifying a set of entity types to describe segments of the query. The method includes identifying at least one search function from the stored records. Each of the at least one search function has a set of required input entity types that is a subset of the identified set of entity types. A first search function of the at least one search function is associated with a first search input state of a first application. The method includes executing the first application within a device. The method includes navigating to the first search input state within the device. The method includes supplying parameters to the first search input state based on the query. The method includes performing a search within the device. The method includes scraping results from a resulting search results state within the device. The method includes assembling the scraped results for each of the at least one search function. The method includes transmitting the assembled results to the user device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 1A and 1B are graphical representations of example user interface progression in mobile apps according to the prior art.

FIGS. 2A and 2B are example user interfaces presented by search input states.

In the drawings, reference numbers may be reused to identify similar and/or identical elements.

DETAILED DESCRIPTION

Introduction

Figures 3, 4:
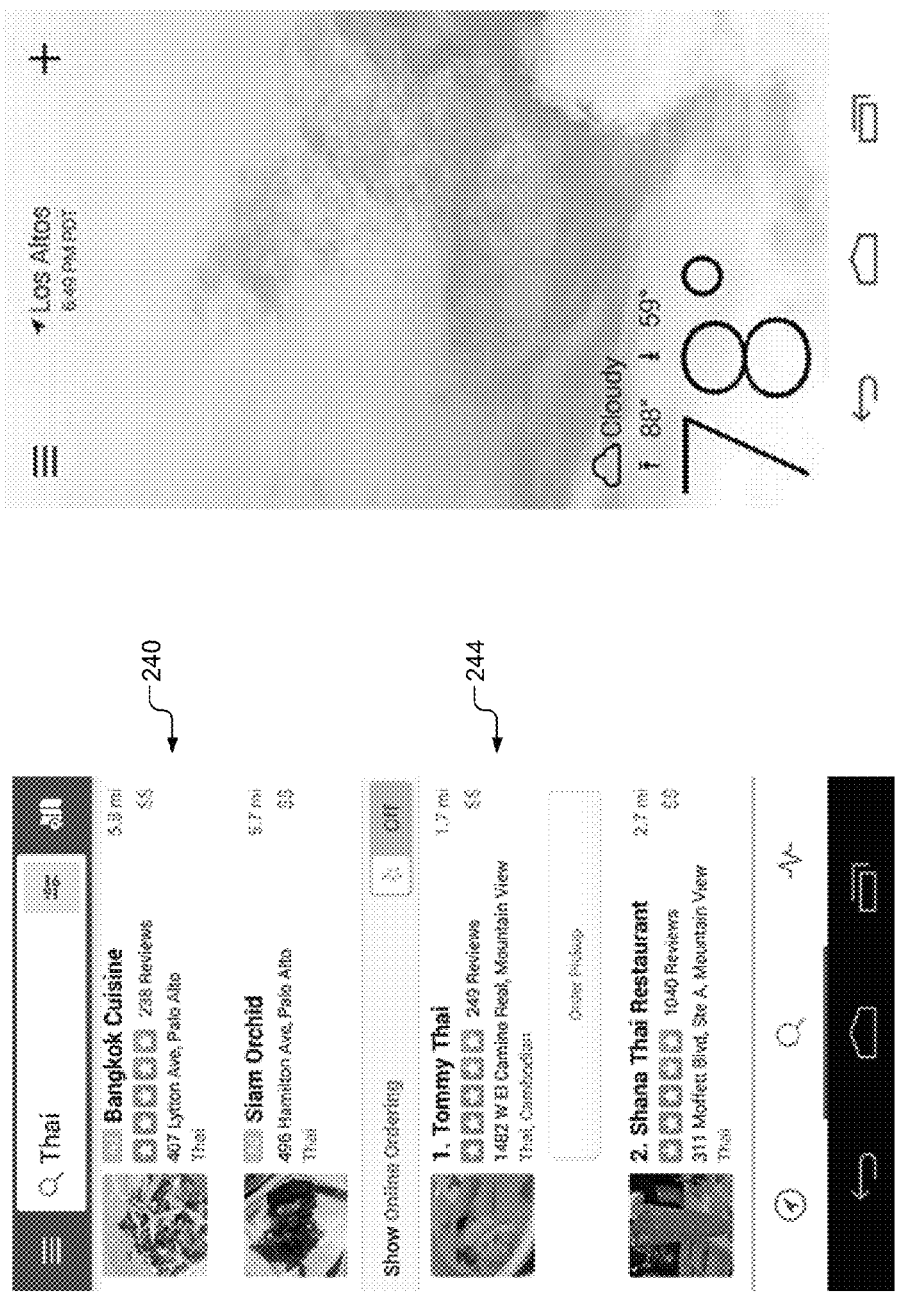
FIGS. 3 and 4 are example user interfaces of search results states.

Companies interested in obtaining, indexing, and surfacing content from mobile applications (referred to interchangeably as "apps" in this disclosure) often have to apply a manual process to each app of interest. The search provider may first need to identify which apps are available and which apps might be of interest to users of the search system. The search provider then has to obtain data about the app, characterize functionality of the app, determine how to reach content of interest within the app, and determine how to interpret content that is retrieved.

With a manual or semi-manual process, even experienced search operators are limited in how many apps can be onboarded to a search system and how quickly those apps can be onboarded. Further, as new versions of apps are released, the onboarding process may need to be at least verified if not updated or redone.

This limits the number of apps that can be encompassed by a search system and therefore limits the amount of information available to a user of the search system. Further, without deep insight into the app, an operator may not identify all of the relevant functionality, states, or available parameters in the app.

Instead of attempting to crawl and index every potential entity of every state of an app, a search system may instead rely on built-in search functionality in the app itself. For example, when a search query from the user is received, relevant apps can be identified and searches can be performed in those apps to identify results responsive to the user's query. For more information about this on-demand data acquisition, which is referred to below as live scraping, see commonly-assigned U.S. patent application Ser. No. 14/981,244 filed Dec. 28, 2015, titled "Crowd-Enabled Architecture for On-Demand Native Application Crawling," with first-named inventor Kalyan Desineni, the entire disclosure of which is incorporated by reference.

In order to use search functionality of an app, the various search functions must be identified and their parameters characterized. This generally requires significant manual involvement. The present disclosure describes a variety of techniques to identify and characterize search functionality of apps using machine automation.

As described in more detail below, a sampling of states of an app may be obtained, such as using a random user interface event injection process. These states can be analyzed to determine whether any of the states appear to be input states for a search. In addition, states can be analyzed to see if they appear to be result states for a search. If multiple similar results states are identified, the state leading to the apparent results states is analyzed with the inference that it is likely a search input state.

Search results states may be characterized by lists or tables, each leading to another state (presumably, an entity state). Therefore, when a state has a grid of similar user interface widgets, the inference is that each of these is a search result. In addition, search results states may have a longer load time caused by the app having to consult a backend server for search results.

Some results states, instead of having a long load time, load quickly but have a refresh operation, which updates the state as results are received remotely from the backend server. Therefore, this refresh operation may indicate a search results state. Further, the network traffic itself may be monitored to identify that a state is a search results state. Traffic to known ad networks and social networks may be ignored, leaving only traffic that is presumed to be to the backend server of the app itself.

Search input states may be determined based on the fact that they need to search results states, as mentioned above. Search input states may also be directly identified based on both visible and invisible data within the state. As an example of visible data, a text box may allow for user entry of a text query. While many text boxes will not correspond to searches, a text box that provides autocomplete inputs is more likely to be a search input state. For example, when the user is typing into a text box corresponding to a user name or password field, no autocompletes will be provided. The search system may distinguish between autocompletes provided by the app and previously-entered text from the user. Previously-entered text may be provided as an autocomplete even for text boxes not corresponding to the searches.

Another indication of a search input state is when some parameter related to a text box is indicative of search. For example, if a hint is provided in a text box (which is generally hidden as soon as a user begins typing), and the hint includes text that a natural language processor considers to be related to searching or finding, the state may be a search input state. As another example, the app may display text (such as "search") or an icon related to search (such as a magnifying glass).

Further, a parameter for the text box may indicate to the operating system that the text box is used for search, which may provide a visual indicator on the keyboard. For example, this may replace the enter key on a virtual keyboard with a search key (such as a forward arrow). As an example, the ANDROID operating system may have a certain IMEOption (Input Method Editor Option) corresponding to this search-specific keyboard. Some operating systems may define specific user interface widgets for searching.

Once candidate search input states are identified, various parameters are supplied to the search input state and the resulting states are monitored. This can confirm that the search input state is actually a search input state. This also allows the search system to identify what parameter values can be supplied. For example, the search system may identify that some parameters do not appear to affect the search results, while other parameters appear to be necessary. For example, a necessary parameter may be one that, when empty, prevents a search input state from transitioning to a search results state.

The search system characterizes what types of values can be provided for each parameter, such as text, integers, floating point numbers, or enumerated types. For example, one parameter may allow for a bullion value (such as yes or no). Another enumerated type may be a list of specific strings that are accepted. When the input type is text, the search system may simulate typing within the text box and record any autocompletes provided by the app. This may help to identify the range of values accepted for that parameter.

Figure 5:
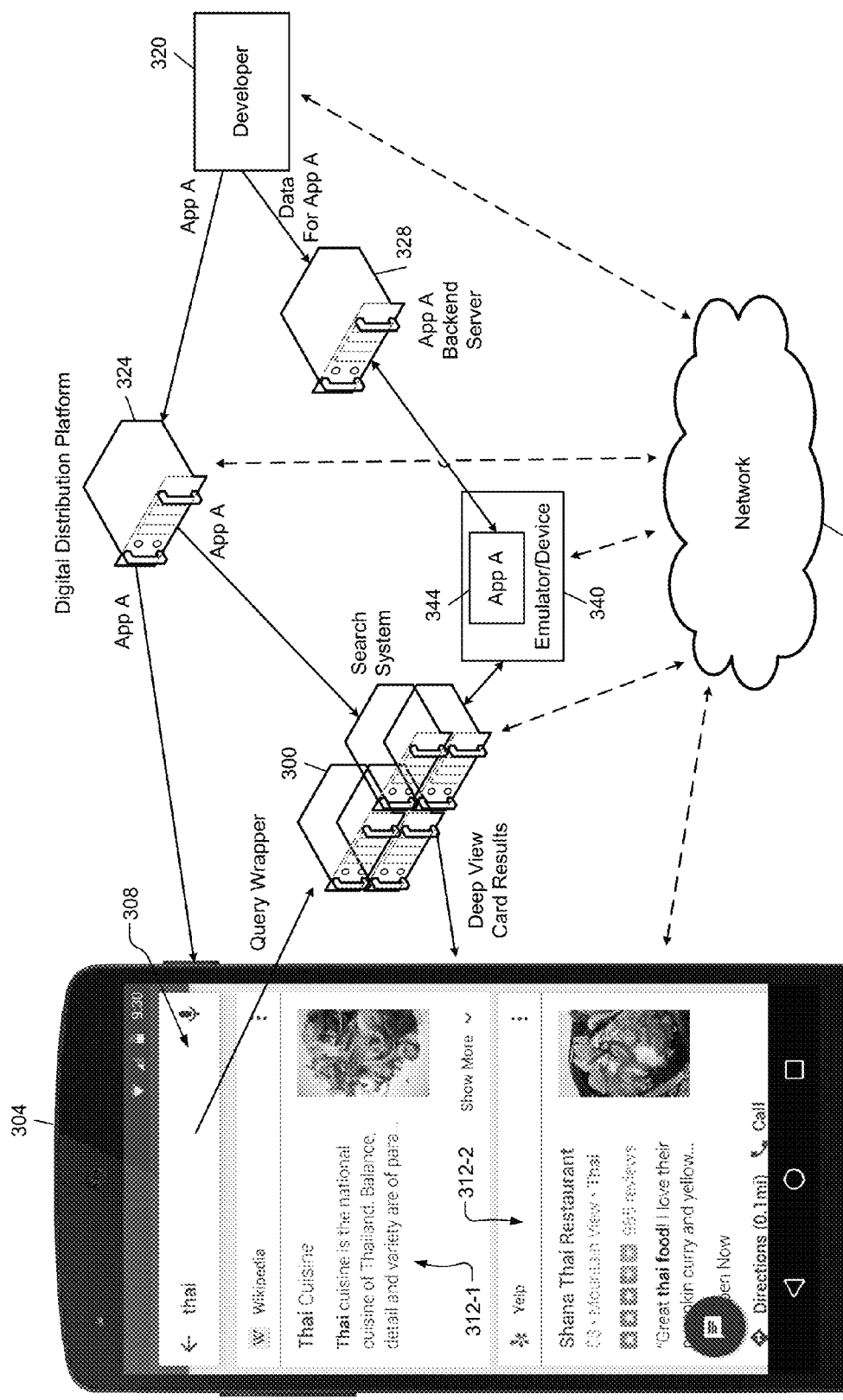
FIG. 5 is a combined graphical user interface and functional block diagram of an example environment for a search system according the principles of the present disclosure.

FIG. 5 shows a search system 300 providing results to a user device 304. The user device 304 is depicted as a smart phone, but could be any other type of user device, such as a laptop, tablet, smartwatch, or desktop computer. Search functionality may be built into an operating system of the user device 304, into a launcher app installed on the user device 304, into a search-system-specific app, or, using a Software Development Kit (SDK), into any other app designed to offer search functionality.

In one example, a text box 308 allows a user to type, speak, or paste text. This text is sent in a query wrapper to the search system 300. The search system 300 responds to the user device 304 with results, which may be in the form of deep view cards (DVCs). A DVC for an app or a state of an app shows additional information, not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and it may even allow the user to directly perform an action without having to navigate to the app state. If the action the user wants to take is to obtain information, in some circumstances, the DVC itself may provide the necessary information to accomplish such action.

For example, a query for "Thai" may return a first DVC 312-1 for the WIKIPEDIA online encyclopedia app and a second DVC 312-2 for the YELP restaurant app. The first DVC 312-1 is related to information about Thai cuisine, while the second DVC 312-2 is directed to a specific restaurant having "Thai" in the name, the reviews, and in the designated cuisine of the restaurant.

An example app (App A) is developed by a developer 320 and provided to a digital distribution platform 324. The digital distribution platform 324 distributes apps to devices such to the user device 304. Popular digital distribution platforms include the GOOGLE PLAY digital distribution platform from Google Inc. and the APP STORE digital distribution platform from Apple Inc. If a result pertaining to App A is shown to a user of the user device 304, the user selects that result. However, if App A is not already present on the user device 304, App A may be downloaded to the user device 304 from the digital distribution platform 324.

The developer 320 stores any data on which App A needs to rely in a backend server 328. For example, if App A were the YELP restaurant review application, the YELP restaurant review application itself may not store all of the information about all of the restaurants within its database. Instead, this information would be stored in the backend server 328 and queried on demand.

As described in more detail below, when the search system 300 receives the query wrapper, the search system 300 may activate search functionality in one or more apps that the search system 300 believes may have relevant results to the query wrapper.

This search functionality may be activated by running a copy of each app in an emulator or device. For example, as shown in FIG. 5, an emulator/device 340 is shown with a copy 344 of App A. As described in more detail below, the emulator/device 340 may include copies of other apps as well, and each one can be opened or brought to the foreground depending on the search functionality desired by the search system 300. The copy 344 of App A queries the backend server 328. The information provided in return is scraped by the emulator/device 340 and provided back to the search system 300. For example, the DVCs 312-1 and 312-2 may have been retrieved from respective copies of the WIKIPEDIA encyclopedia app and the YELP restaurant review app.

While the data flow in FIG. 5 is shown with solid lines, the various devices and systems in FIG. 5 may actually communicate with each other via network 350. The network 350 may include wired and wireless local area networks, personal area networks, and wide area networks such as the Internet.

As indicated above, in order for the search system 300 to access the search functionality of App A via the emulator/device 340, the search system 300 needs to onboard (that is, characterize) the search functionality of App A. The following figures and text describe how this can be done with computerized analysis. App A is retrieved from the digital distribution platform 324 via the search system 300 and then processed as described in more detail below.

Block Diagrams

Figure 6:
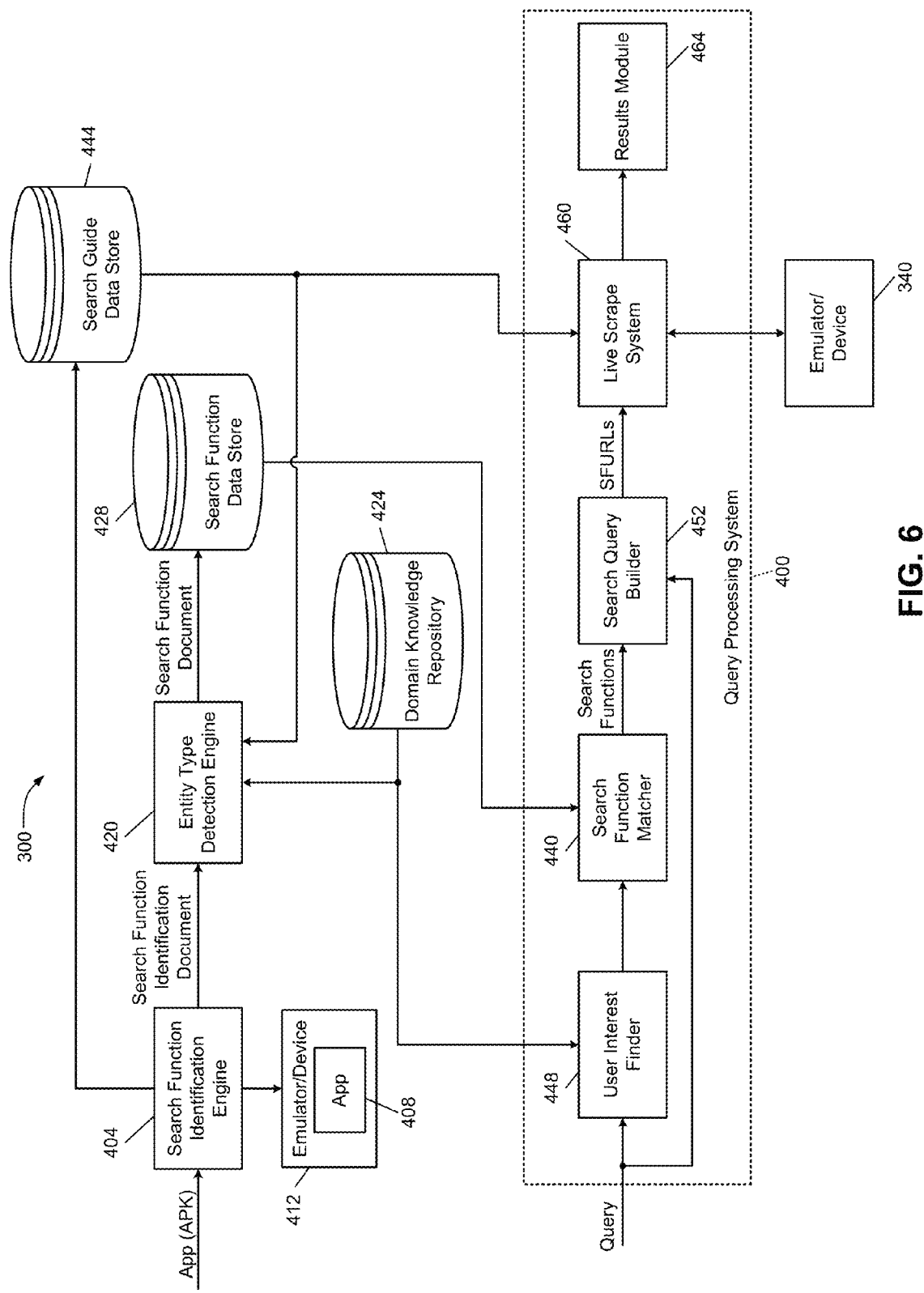
FIG. 6 is a functional block diagram of an example implementation of a search system.

In FIG. 6, a functional block diagram of an example implementation of the search system 300 includes a query processing system 400. However, before the query processing system 400 can process queries, apps are onboarded (that is, analyzed and characterized).

A search function identification engine 404 receives an app, such as from a digital distribution platform. For an ANDROID operating system application, the app may be provided as an APK (Android Package File). The search function identification engine 404 executes a copy 408 of the app in an emulator/device 412. In various implementations, the emulator/device 412 may be the same as the emulator/device 340.

In some implementations, a cloud-hosted set of emulators and/or devices offers multiple emulators and/or devices, and the number available may be increased or decreased based on a request to the cloud hosting provider. In this way, some emulators or devices can be working on live user queries while other emulators or devices are used for app onboarding. In various implementations these emulators and devices may be kept in separate pools to segment production query processing from asynchronous app onboarding.

As described in more detail below, the search function identification engine 404 generates a search function identification document. An entity type detection engine 420 analyzes the parameters required for the various search functions identified by the search function identification engine 404. As an example, the entity type detection engine 420 may determine that one parameter for a search function is the name of a movie while another parameter is a year of release. This entity type detection is described in more detail in commonly-assigned U.S. Prov. App. No. 62/220,737 filed Sep. 18, 2015, titled "Entity-Type Search System," with first-named inventor Sudhir Mohan, the entire disclosure of which is incorporated by reference.

As a simple example, a domain knowledge repository 424 may have text data about a variety of industry verticals. For example, the domain knowledge repository 424 may have lists of restaurant names, lists of movie names, lists of actor names, lists of video games, lists of states and provinces, etc. The entity type detection engine 420 identifies whether a majority of parameter values for a certain search function parameter match with values in a single entity type within the domain knowledge repository 424.

The search function identification document is then annotated by the entity type detection engine 420 with entity types for the parameters needed for various search functions. The resulting annotated document is referred to here as a search function document. The entity type detection engine 420 may also tag the fields of search result pages of the app being onboarded, so that the search function document reflects what apparent entity types are returned as search results.

A search function data store 428 stores search function documents for each app that has been onboarded. Using the search function data store 428, a search function matcher 440 of the query processing system 400 can identify search functions whose required parameter types match parameters provided by a query.

While the search function identification engine 404 is identifying search functionality in a new app, the search function identification engine 404 stores guides for each function in a search guide data store 444. Each guide provides the necessary information to navigate to the search input state where search parameters can be supplied. The search guides also have a mapping of which user interface widgets in the search input state correspond to which supplied parameters. The search guide may also indicate what user interface action to take to execute the search.

The guide to reach a search input state may include a sequence of user interface events to perform in order from a home state of the app. For example, each user interface event for an Android operating system app may be described using an XPath expression, while each user interface event for an iOS operating system app may be described using a user interface widget ID assigned internally by the iOS operating system.

The query processing system 400 includes a user interest finder 448 that attempts to recognize what entity types have been provided in a query. This entity type detection may be based on the same domain knowledge repository 424. Multiple different interpretations of the query may be output by the user interest finder 448. For example only, a certain string may be a movie name as well as the name of a video game. The most likely interpretations are provided to the search function matcher 440.

The search function matcher 440 selects search functions from the search function data store 428 that have input parameters matching the parameters recognized by the user interest finder 448. The set of relevant search functions is provided to a search query builder 452. The search query builder 452 combines the generic search function with specific values from the query.

The resulting populated search functions may be referred to as Search Function Uniform Resource Locators (SFURLs). A live scrape system 460 accesses data requested by the SFURLs. For example, the live scrape system 460 may access native apps running in emulators or devices, such as the emulator/device 340. The live scrape system 460 may also access web editions of an app using a live web scraping system. When using a native app, the live scrape system 460 may rely on search guides from the search guide data store 444 to navigate to the appropriate state and supply the parameters to the app within the emulator/device 340.

A results module 464 formats results obtained by the live scrape system 460 for providing to the source of the original query. For example, the results module 464 may format some results to fit a screen of the device that transmitted the query. For other results, such as from specific apps, the results module 464 may remove, transpose, or otherwise modify specific data from results.

Characteristics

Figure 7:
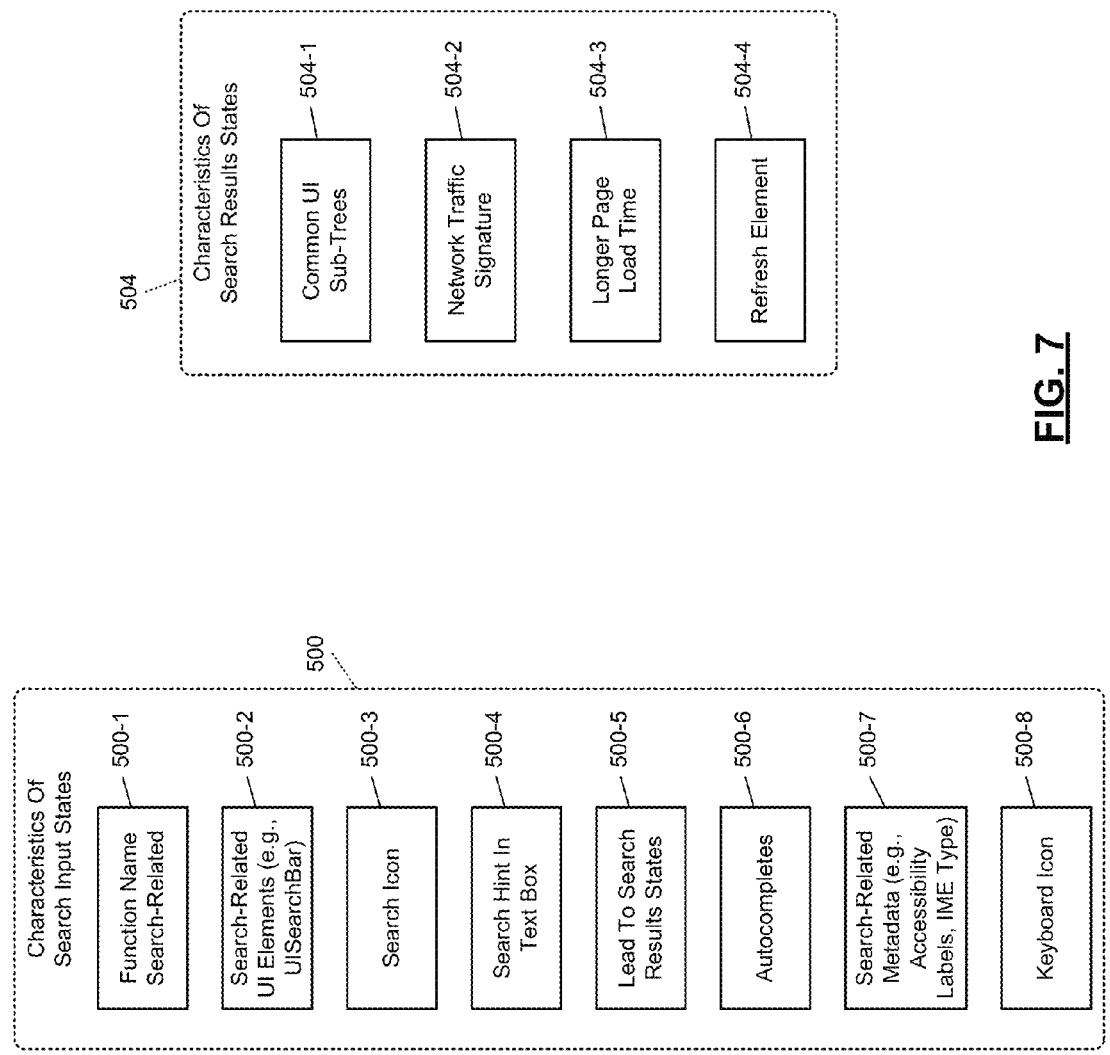
FIG. 7 is a graphical representation of example state characteristics used by heuristics in the search system.

In FIG. 7, characteristics 500 of search input states are described for use with heuristics to determine search input states of an application. The more of the individual characteristics 500 possessed by a state, the more likely the state is to be a search input state. In various implementations, a weighted sum of the characteristics 500 may be determined, and if the weighted sum exceeds a threshold, the state is considered to be a search input state.

While some may be more heavily weighted than others, the presence of each of the characteristics 500 suggests that the state is a search input state. Characteristic 500-1 is the name of a called function being search-related, such as including the words "search" or "find." The functions of interest are those called when a user interface element of the state is selected. In addition to the function name (or, method name), a class name for the function may also be evaluated.

Characteristic 500-2 is the presence of search-specific user interface (UI) widgets in the state. Certain operating systems may define specific UI widgets for performing search input (for example, a UISearchBar class of UI element).

Characteristic 500-3 is the presence of an icon related to search (such as a magnifying glass), especially near to an input field. Characteristic 500-4 is search-related hints in text boxes. Hints may be determined to be search-related using natural language processing.

Characteristic 500-5 is whether the present state leads to search result states. For example, if a number of states appear to be search results states, and the present state, through various user interface interactions, can lead to those states, the present state is likely to be a search input state.

Characteristic 500-6 is the presence of autocompletes, which are often associated with search inputs to reduce the need for a user to type text.

Characteristic 500-7 is search-related metadata. For example, accessibility labels may be used to allow accessibility tools (such as screen readers) to identify various fields in a state. If the accessibility labels are specific to search or include text related to search, the present state is likely to be a search input state. Some user interface elements may cause a soft (or virtual) keyboard to appear on screen (and the character of the keyboard may be determined by an IME (Input Method Editor)) type. For example, there may be a specific IME type defined for search input, which may replace the enter key of a standard soft keyboard with a forward arrow or some other indicator that a search should be performed in response to that key being pressed.

Characteristic 500-8 is an icon specifically for a search-related soft keyboard. For example, if the app has provided its own keyboard, or if an IME type does not unequivocally indicate that the keyboard is used for search, or if a search icon is otherwise used with the keyboard icon, this may indicate that the present state is a search input state.

Characteristics 504 tend to indicate that a state is a search results state. Characteristic 504-1 is a grid of elements, which is how search results are often presented. If each of the items in a list appear to have a similar set (or, tree) of UI elements, it is more likely that these are search results and not disparate content simply arranged in a list. For more information about identifying similar UI sub-trees, see commonly-assigned U.S. application Ser. No. 14/869,127, filed Sep. 29, 2015, titled "State Extrapolation for Automated and Semi-Automated Crawling Architecture," with first-named inventor Kalyan Desineni, the entire disclosure of which is incorporated by reference.

Characteristic 504-2 is the presence of network traffic to a backend server of the app. When an app performs a search, the search query is often passed to a backend data service of the app. This traffic can be monitored and infer that the present state is a search results state when network traffic was generated while transitioning to the present state. Because network traffic may occur for a variety of reasons, including advertising and connection to social networks, a filter may be defined to ignore network traffic associated with known networks.

Characteristic 504-3 is a longer page load time, which may be associated with a remote search. In order to avoid longer page load times when a remote query is necessary, some apps may return a results state quickly, but then refresh the state as results are returned by the backend data service. The presence of a refresh element is characteristic 504-4.

Search Function Identification Engine

Figure 8:
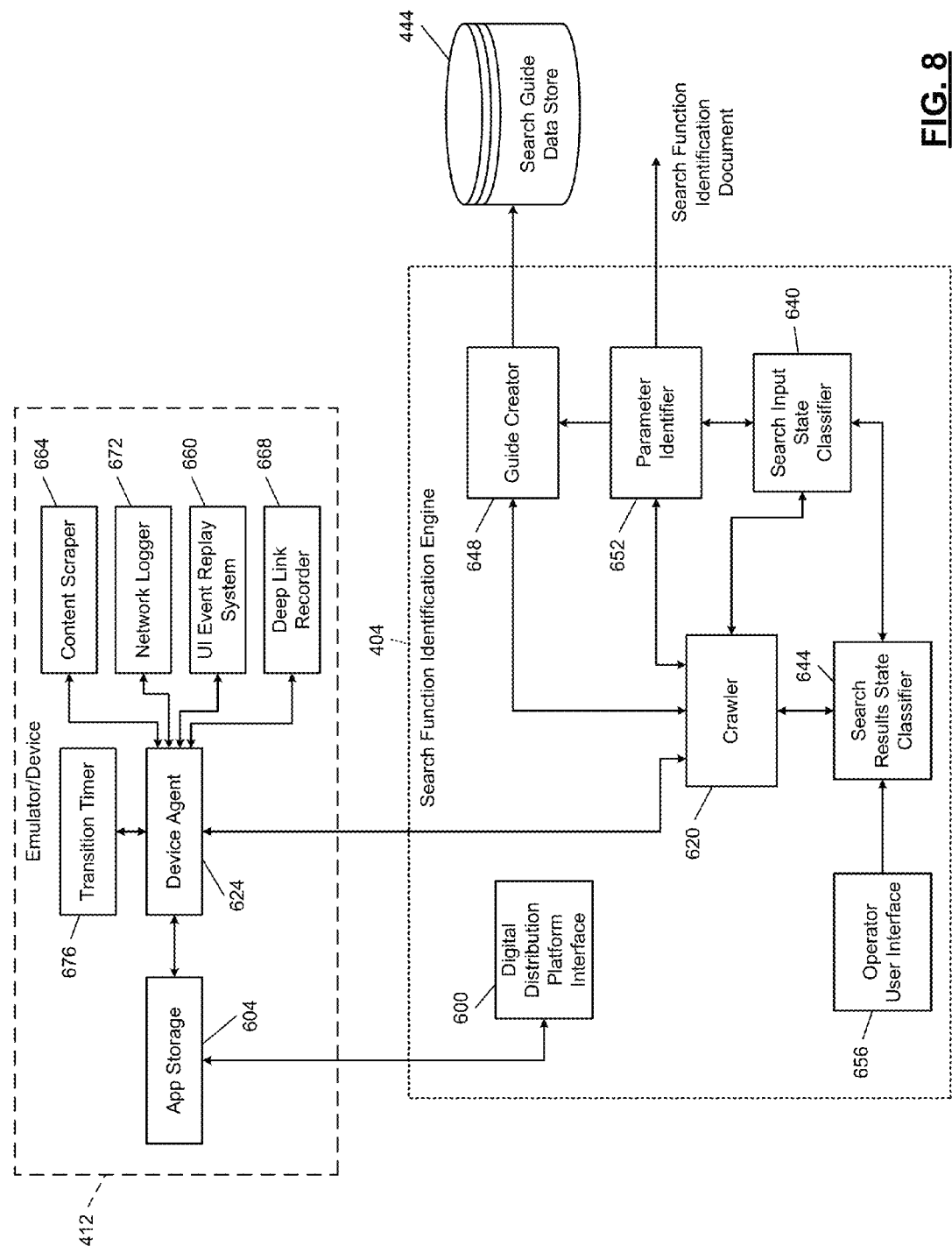
FIG. 8 is functional block diagram of example implementations of a search function identification engine and an emulator/device.

In FIG. 8, a functional block diagram of an example of the search function identification engine 404 includes a digital distribution platform interface 600, which requires an app to be onboarded from a digital distribution platform. The app is then provided to app storage 604 within the emulator/device 412.

A crawler 620 communicates with a device agent 624 of the emulator/device 412. The crawler 620 may sample a variety of states of the app to be onboarded so that the states can be analyzed by a search input state classifier 640 and a search results state classifier 644. A random user interface walk is described below in FIG. 11. Additional information about unguided crawling can be found in commonly-assigned U.S. application Ser. No. 14/849,540, filed Sep. 9, 2015, titled "Unguided Application Crawling Architecture," with first-named inventor Kalyan Desineni, the entire disclosure of which is incorporated by reference.

As the crawler 620 crawls the app, information about how to reach each state is stored. States that are determined to correspond to search input states are provided to a guide creator 648, which stores these guides in the search guide data store 444. This allows a live scrape system 460 of FIG. 6 to reach the search input states of the app in order to perform searches within the app. The guide creator 648 also stores a mapping of parameters of the search to user interface elements of the search input state. This information is stored in the search guide data store 444.

The search input state classifier 640 identifies whether states crawled by the crawler 620 are search input states according to heuristics based on the characteristics 500. The search results state classifier 644 identifies whether states crawled by the crawler 620 are search results states according to heuristics based on the characteristics 504.

Although the search function identification engine 404 can operate in a wholly automated manner, an operator user interface 656 allows an operator to provide input on the process. For example, the operator may note certain states of the app as being search results states. If these states had not yet been identified, they can be used by the search input state classifier 640 to verify that existing search input states need to know those search results states.

The parameters supplied to each search input state are determined by a parameter identifier 652. The parameter identifier 652 may also determine what type of input each parameter allows. For example, parameter types may include integers, enumerative values, or text. The parameter identifier 652 may also simulate typing to allow for autocomplete entries to be gathered.

For example, the parameter identifier 652 may iterate through each letter of the alphabet, noting the suggested autocomplete values for each. Two-letter combinations may then be input, and if any of the resulting autocompletes have not been seen previously, the parameter identifier 652 may iterate through all two-letter combinations. The parameter identifier 652 may continue iterating through increasing numbers of letter combinations until no new autocomplete values are found.

Once the parameter identifier 652 has identified the parameters of each search input state, the various search functions are output as a search function identification document. The search function identification document may include multiple functions, each corresponding to a separate type of search permitted by the app.

In various implementations, multiple searches may be initiated from the same search input state. For example, some searches may be canned searches that are distinct from text-based searches accessible from the same state. Further, some searches may be performed with differing numbers and types of parameters. For example, a restaurant search by cuisine name may be considered separately from a restaurant search by cuisine name and location.

The search function identification document may include a search function URL for the search function. For illustration, see the following search function entry for the TED talks app:

```
{
  "version": "1.0",
  "funcs": [
    {
      "sfUrl":
"func://googleplay/android/com.ted.android/39/VXhV_hNM",
      "params": [
        {
          "name": "p0",
          "desc": "  Search Talks",
          "type": "text"
        }
      ]
    }
  ]
}
```

This search function entry includes a version number and an array of functions (a single-element array in this case). A Search Function URL (SFURL) encodes the name of the digital distribution platform ("googleplay") that provided the app, since different digital distribution platforms may have different versions of an app.

The SFURL may also indicate the operating system for the app ("android"), a name of the app ("com.ted.android"), a version of the app ("39"), and an identifier of the specific function ("VXhV_hNM"). The identifier of the specific function may, in some implementations, be a hash of the guide that is used to traverse the app to reach the specified search state.

Along with the SFURL, a list of parameters may be provided. Each parameter in the list may include a unique identifier, which may simply begin at zero and increase by one for each parameter (for example, starting at "p0" and progressing to "p1," etc.). Each parameter may also have a type of data that can be supplied for that parameter, such as text, integer, etc.

Each parameter may also have a description (e.g., "Search Talks"), which may be based on the hint provided for a text box, an accessibility tag, etc. Until processing by the entity type detection engine 420, the description may not hold any semantic meaning for the search system 300, and may instead simply be a copy of text scraped from the state.

The emulator/device 412 includes a UI event replay system 660 that allows user interface events to be injected into the app. This may be performed using accessibility controls. UI injection may also be performed with hooks specifically built into an operating system executing on the emulator/device 412 for this purpose.

A content scraper 664 extracts user interface widget data and metadata from the present state of the app. A deep link recorder 668 records the user interface events that have been performed in the path from the home state to the present state. The deep link recorder 668 may also record parameters that allow for an API (Application Programming Interface) call to be made to reach the state directly. For example only, a certain data structure, such as an intent in the ANDROID operating system, may be passed to the operating system to allow for a specific state of an app to be instantiated. A network logger 672 monitors network traffic from the app. A transition timer 676 times how long it takes for a new state to be displayed after the most recent user interface event.

Flowcharts

Figure 9:
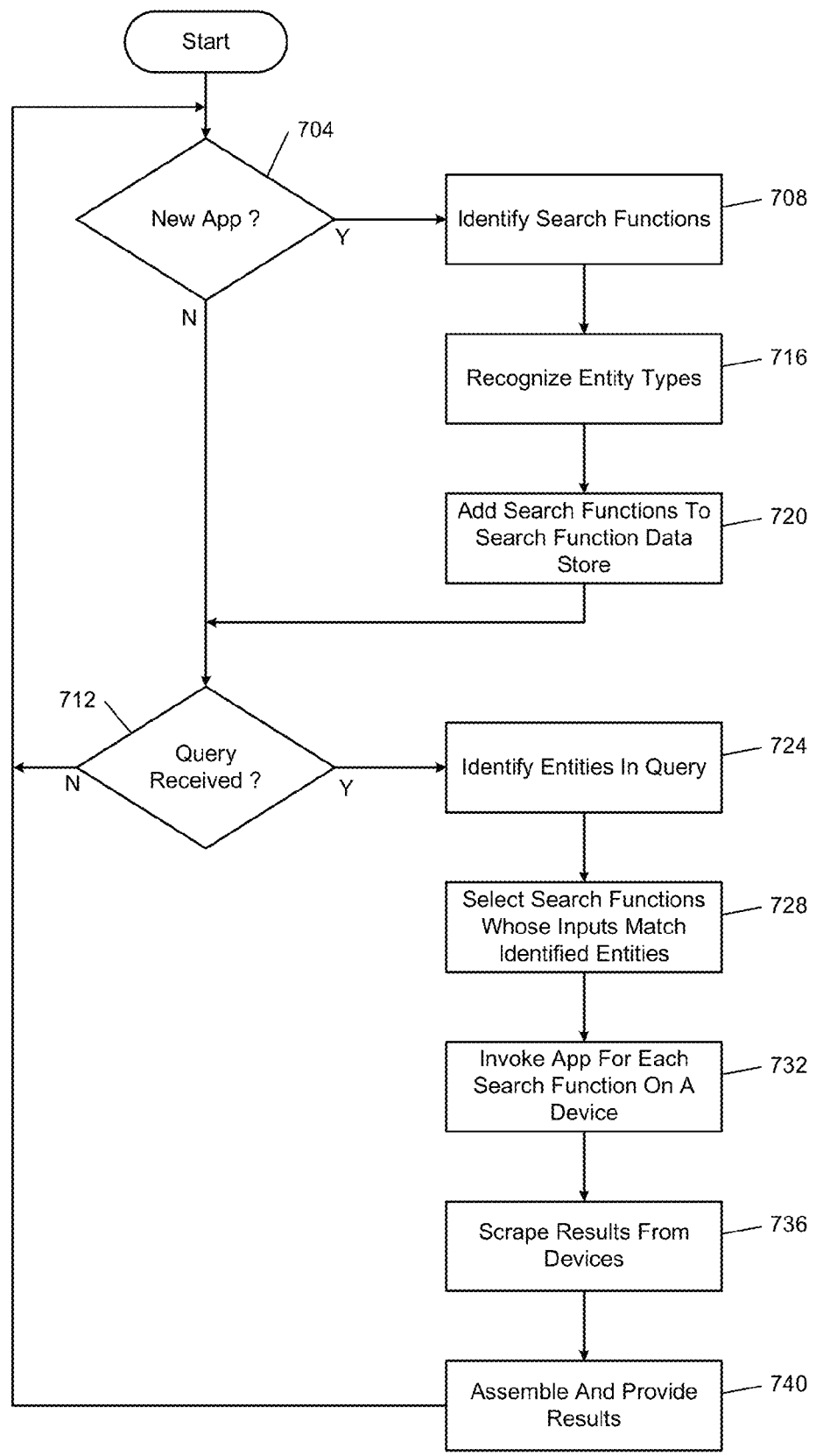
FIG. 9 is a flowchart of example overall operation of the search system.

In FIG. 9 overall operation of the search system is described. At 704, if a new app is present for onboarding, control transfers to 708; otherwise, control transfers to 712. The new app may be provided by a developer or may be selected by the search system based on some criterion, such as popularity. For example, apps that reach the top one hundred most-popular apps in a digital distribution platform may be considered for onboarding.

At 708, control identifies the search functions offered by the app. At 716, control recognizes entity types supplied as parameters to the search functions. At 720, control adds annotated search functions to a search function data store. Control then continues at 712.

At 712, if a query has been received, control transfers to 724; otherwise, control returns to 704. At 724, control identifies the types of entities specified by the query. At 728, control selects search functions from the search function data store whose inputs match the identified entity types.

At 732, on a controlled device (such as a physical device or a hardwire emulator) the corresponding app for each search function is invoked. In various implementations, devices may be assigned to run popular apps so the app is already running when the query is received. At 736, control scrapes results from the devices where the searches were performed. At 740, the results are assembled and provided to the sender of the query. Control then returns to 704.

Figure 10:
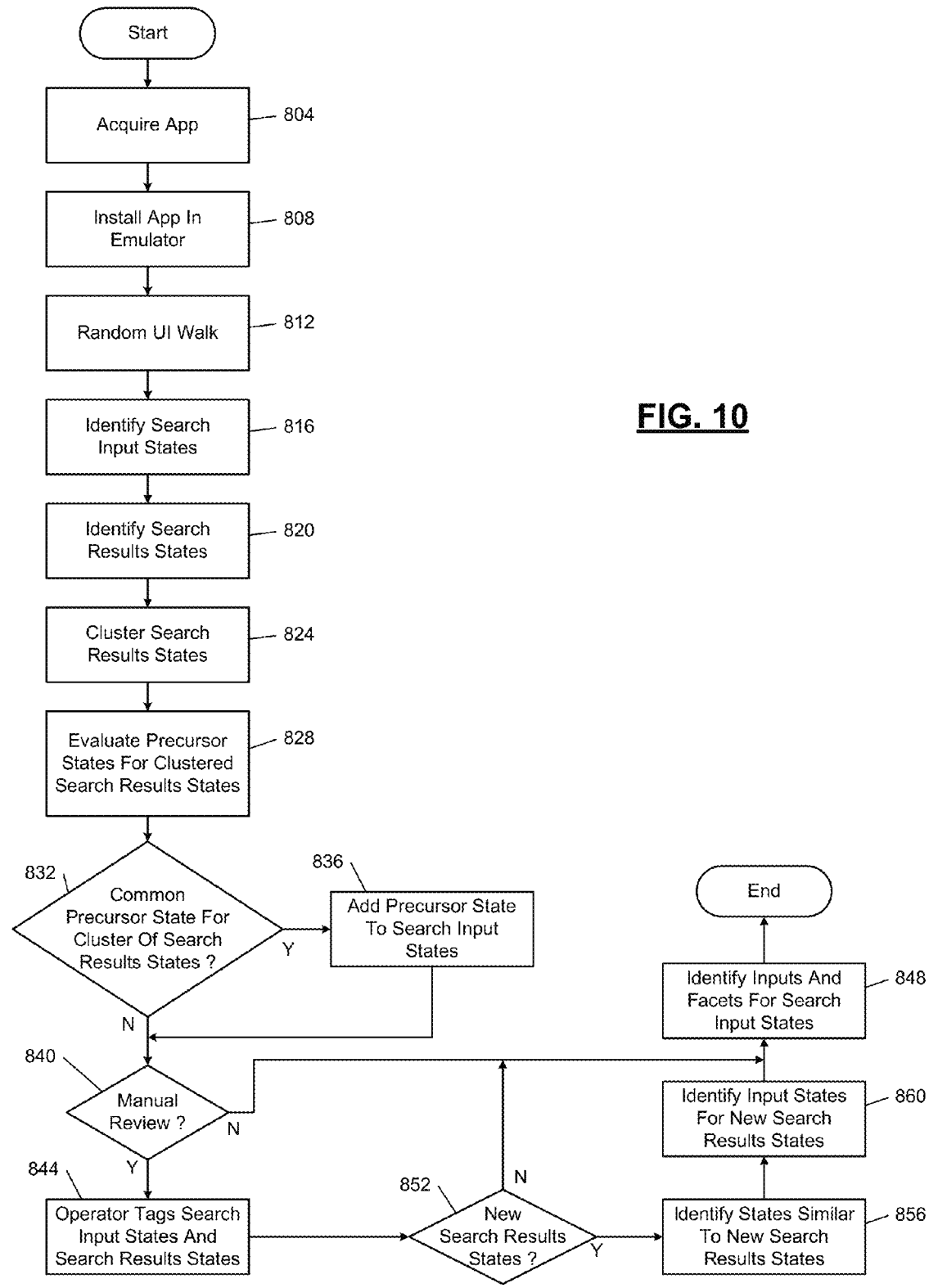
FIG. 10 is a flowchart of example operation for incorporating a new app into the search system.

FIG. 10 shows example operation for identifying search functions. Control begins at 804, where an app to onboard is acquired, such as from a digital distribution platform. At 808, control installs the app in an emulator or hardware device. At 812, control performs a sampling of states of the app, also known as a crawl. This crawl may be performed using a random user interface walk, described in more detail in FIG. 11.

At 816, control identifies search input states from the sample states. At 820, control identifies search results states from the sampled states. At 824, control clusters similar search results states. This may be performed similarly to identifying common subtrees except that the entire tree of one search results state is compared to the entire tree of another search results state. If the trees match with a high degree of similarity, then the search results states may have been reached from the same search input state, but with different parameter values supplied.

At 828, control evaluates precursor states for the clustered search results states. In other words, control determines which states led to the clustered search results states, according to the guides generated by the crawl at 812. At 832, control determines whether there appears to be a common state that leads to each of the search results states in the cluster. If so, control transfers to 836; otherwise, control transfers to 840. At 836, it appears that the precursor state to the search results states is actually a search input state. This search input state is then added to the set of identified search input states and control continues at 840.

At 840, control determines whether a manual review will be performed. This may be based on the availability of a manual operator or the importance of the app. For example, the importance of the app may be proportional to its popularity. If manual review is to be performed, control transfers to 844; otherwise, control transfers to 848. At 844, the operator manually tags search input states and search results states. At 852, if any new results states are identified compared to the already-identified search results states, control transfers to 856; otherwise, control transfers to 848.

At 856, control identifies states similar to the newly-identified search results states. At 860, control identifies input states leading to the new search results states. Control continues at 848. At 848, control identifies inputs and facets for search input states. Inputs are the parameters that appear to be necessary to complete a search, while facets provide additional criteria for the search. For example, facets for a restaurant search may include wheelchair accessibility, family friendliness, and whether smoking is permitted. Control then ends.

Each input (also called a parameter) for a search input state may have a corresponding guide that records how a value can be supplied for that parameter. For example, this may include an identification of a UI element corresponding to that parameter, and what UI action to perform in order to control that parameter. For illustration only, an example of a guide for controlling a parameter (requiring two actions) is shown here:

```
[
  {
    "steps": [
      {
        "action": {
          "xpath":
"/com.android.internal.policy.impl.PhoneWindow$DecorView/com.
android.internal.widget.ActionBarOverlayLayout[1]/com.android.
internal.widget.ActionBarContainer[1]/com.android.internal.widget.
ActionBarView[1]/com.android.internal.view.menu.ActionMenuView
[1]/com.android.internal.view.menu.ActionMenuItemView[1]",
          "type": "CLICK"
        }
      },
      {
        "action": {
          "xpath":
"/com.android.internal.policy.impl.PhoneWindow$DecorView/android.
widget.LinearLayout[1]/android.widget.FrameLayout[1]/android.
app.SearchDialog$SearchBar[1]/android.widget.LinearLayout[1]/android.
widget.SearchView[1]/android.widget.LinearLayout[1]/android.
widget.LinearLayout[1]/android.widget.LinearLayout[1]/android.widget.
SearchView$SearchAutoComplete[1]",
          "type": "TEXT_ENTER"
        },
        "name": "p0"
      }
    ],
    "sfUrl":
"func://googleplay/android/com.ted.android/39/VXhV_hNM"
  }
]
```

Figure 11:
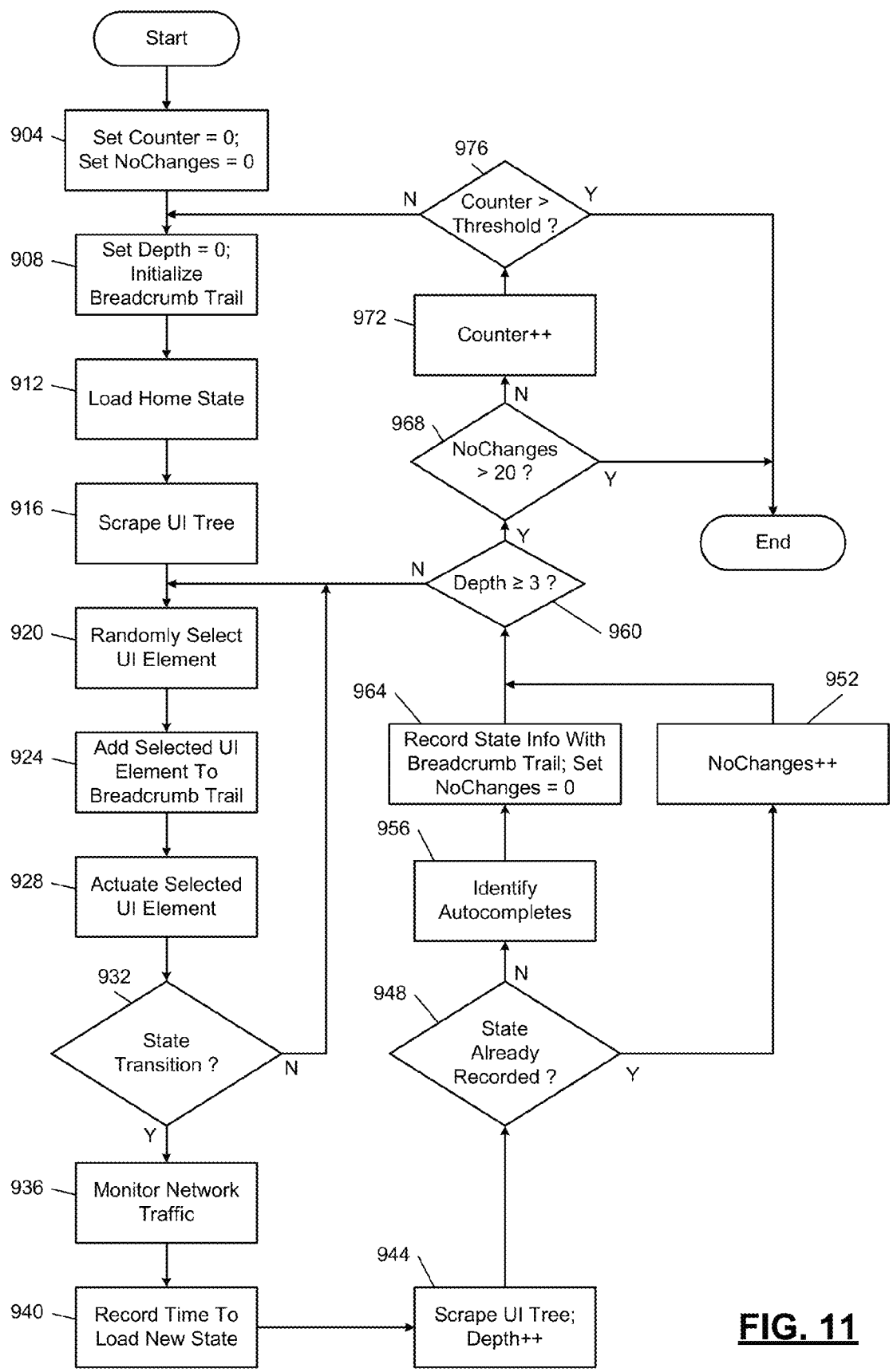
FIG. 11 is a flowchart of example operation of user interface traversal.

In FIG. 11, an example process for sampling states of an app is presented. Control begins at 904, where a counter is initialized to zero. The counter indicates the number of UI paths that have been taken during the present crawl. In addition, a variable called NoChanges is set to zero. This variable indicates the number of consecutive states that have been encountered that have already been previously encountered.

At 908, a variable called Depth is set to zero, which indicates how far down a path control has progressed. Although the Depth in FIG. 11 is measured as the number of states traversed during the control path, the Depth could instead count the number of UI interactions. Also at 908, a breadcrumb trail data structure is initialized. The breadcrumb trail will track the user interface interactions performed while progressing down the path. For illustration only, an example breadcrumb trail with two steps is presented here:

```
[
  {
    "steps": [
      {
        "action": {
          "type": "CLICK",
          "xpath":
"/com.android.internal.policy.impl.PhoneWindow$DecorView/com.
android.internal.widget.ActionBarOverlayLayout[1]/com.android.
internal.widget.ActionBarContainer[1]/com.android.internal.widget.
ActionBarView[1]/com.android.internal.view.menu.ActionMenuView
[1]/com.android.internal.view.menu.ActionMenuItemView[1]"
        },
        "target": 1
      },
      {
        "action": {
          "text": "machine learning",
          "type": "TEXT_ENTER",
          "xpath":
"/com.android.internal.policy.impl.PhoneWindow$DecorView/android.
widget.LinearLayout[1]/android.widget.FrameLayout[1]/android.
app.SearchDialog$SearchBar[1]/android.widget.LinearLayout[1]/android.
widget.SearchView[1]/android.widget.LinearLayout[1]/android.
widget.LinearLayout[1]/android.widget.LinearLayout[1]/android.
widget.SearchView$SearchAutoComplete[1]"
        },
        "target": 2
      }
    ],
    "source": 0
  }
]
```

At 912, control loads the home state of the app. At 916, control scrapes the UI tree of the state. At 920, control randomly selects a UI element. At 924, control adds the selected UI element to the breadcrumb trail. At 928, control actuates the selected UI element, such as by simulating a tab, a selection, or text entry. At 932, control determines whether a state transition has occurred based on the UI element actuation. If so, control transfers to 936; otherwise, control returns to 920.

At 936, control monitors network traffic occurring during the state transition. As discussed in more detail above, some network traffic may indicate that the app is consulting a backend server for search results. At 940, control records the time required to load the new state. At 944, control scrapes the UI tree of the new state and increments the Depth variable.

At 948, control determines whether the present state has already been recorded. If so, control transfers to 952; otherwise, control transfers to 956. The state has already been recorded if the present breadcrumb trail matches the breadcrumb trail for an already recorded state. However, a state can be reached using different breadcrumb trails. Therefore, fuzzy matching may be performed between the present state and recorded states, which mitigates the effect of changes such as new advertisements leading to false negatives.

At 952, the state has already been recorded and therefore the NoChanges variable is incremented. Control continues at 960. At 956, control identifies autocomplete values for any text boxes and enumerated values for any other UI options. At 964, control records state information with the breadcrumb trail. The state information may include the UI tree, content from the state, and additional information, such as the autocompletes and enumerated values identified in 956. Further, the NoChanges variable is set to zero because a new state has been found. Control continues at 960.

At 960, if the present Depth is greater than or equal to a predetermined value, such as three, control transfers to 968; otherwise, control returns to 920 to continue the current path. At 968, control determines whether the NoChanges value is greater than a predetermined threshold, such as twenty. If so, the sampling may be complete and therefore control ends. Otherwise, sampling continues at 972, where Counter is incremented. Control continues at 976, where if Counter is greater than a predetermined threshold, control ends; otherwise, control returns to 908 to traverse another path.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 312(f) unless an element is expressly recited using the phrase "means for" or, in the case of a method claim, using the phrases "operation for" or "step for."

What is claimed is:

1. A search system comprising:
a device controller configured to provision a device to execute a copy of a selected mobile application selected from among a plurality of mobile applications;
a crawler configured to extract content and metadata from a plurality of states of the copy of the selected mobile application using the device;
a search input state classifier configured to identify search input states within the plurality of states of the selected mobile application, wherein identifying search input states is performed based on a first set of heuristics, wherein the first set of heuristics includes recognition of user-visible search indicia from the extracted content and metadata of the selected mobile application and recognition of items of the extracted metadata of the selected mobile application that correlate with search functionality;
a parameter identifier configured to identify, for each of the search input states of the selected mobile application, necessary input parameters for a search function corresponding to the search input state;
a search function data store configured to store a record for each identified search function in the selected mobile application, wherein each record includes:
a navigation path within the selected mobile application to reach a search input state of the corresponding search function,
an indication of input parameters required to be supplied to the corresponding search function, and
a mapping of the input parameters to user interface widgets of the search input state; and
a query processing system configured to, in response to a query, (i) identify a first search function record from the search function data store based on the query, (ii) within a first mobile application corresponding to the first search function record, navigate to the search input state of the first search function record according to the navigation path of the first search function record; (iii) based on parameters specified by the query, selectively perform the search function of the first search function record in the first mobile application, (iv) scrape content from a resulting search results state of the first mobile application, and (v) present the scraped content to a user.

2. The search system of claim 1 further comprising a search results state classifier configured to identify search results states within the plurality of states based on a second set of heuristics, wherein the second set of heuristics includes identification of a list of repeated widget groups.

3. The search system of claim 2 wherein the search input state classifier is configured to identify a precursor state to the identified search results states and store the precursor state as a search input state.

4. The search system of claim 2 further comprising:
an operator interface configured to allow an operator to designate a state of the selected mobile application as a search results state,
wherein the search input state classifier is configured to identify a precursor state to the operator-designated search results state and store the precursor state as a search input state.

5. The search system of claim 1 wherein:
the user-visible search indicia includes a textual hint;
the user-visible search indicia includes a search-specific keyboard;
the metadata that correlates with search functionality includes a search-specific widget type; and
the metadata that correlates with search functionality includes an accessibility tag.

6. The search system of claim 1 wherein the crawler is configured to (i) randomly select user interface elements within the selected mobile application for actuation and (ii) extract content and metadata from each state encountered as a result of the actuation of the randomly-selected user interface elements.

7. The search system of claim 1 wherein the parameter identifier is configured to gather autocomplete data from text input fields by supplying letters and numbers and scraping autocomplete suggestions.

8. The search system of claim 1 wherein the device comprises one of:
an emulator configured to execute an operating system on emulated hardware, wherein the operating system is selected based on an operating system the selected mobile application was compiled for; and
a simulator configured to simulate interaction of the operating system with the selected mobile application.

9. The search system of claim 1 further comprising a digital distribution platform interface configured to download the selected mobile application from a digital distribution platform.

10. The search system of claim 1 wherein the query processing system comprises:
a user interest finder configured to receive a query from a user device and identify a set of entity types to describe segments of the query;
a search function matcher configured to identify at least one search function record from the search function data store, wherein:
the at least one search function record includes the first search function record, and
each of the at least one search function record has a set of required input entity types that is a subset of the identified set of entity types;
a live scrape system configured to:
execute the first mobile application within a device;
within the first mobile application, navigate to the search input state of the first search function record according to the navigation path of the first search function record;
supply parameters to the search input state based on the parameters specified by the query;
perform the search function in the first mobile application; and
scrape content from a resulting search results state; and
a results module configured to assemble the content from the live scrape system for each of the at least one search function and transmit the assembled content to the user device.

11. A method of operating a search system, the method comprising:
provisioning a device to execute a copy of a selected mobile application selected from among a plurality of mobile applications;
extracting content and metadata from a plurality of states of the copy of the selected mobile application executing on the device;
identifying search input states within the plurality of states of the selected mobile application, wherein identifying the search input states is performed based on a first set of heuristics, wherein the first set of heuristics includes recognition of user-visible search indicia from the extracted content and metadata of the selected mobile application and recognition of items of the extracted metadata of the selected mobile application that correlate with search functionality;

identifying, for each of the search input states of the selected mobile application, necessary input parameters for a search function corresponding to the search input state;

storing a record for each identified search function in the selected mobile application, wherein each record includes:
 a navigation path within the selected mobile application to reach a search input state of the corresponding search function,
 an indication of input parameters required to be supplied to the corresponding search function, and
 a mapping of the input parameters to user interface widgets of the search input state; and in response to a query, (i) identifying a first search function record from based on the query, (ii) within a first mobile application corresponding to the first search function record, navigating to the search input state of the first search function record according to the navigation path of the first search function record, (iii) based on parameters specified by the query, selectively performing the search function of the first search function record in the first mobile application, (iv) scraping content from a resulting search results state, and (v) presenting the scraped content to a user.

12. The method of claim 11 further comprising identifying search results states within the plurality of states based on a second set of heuristics, wherein the second set of heuristics includes identification of a list of repeated widget groups.

13. The method of claim 12 further comprising:
 identifying a precursor state to the identified search results states; and
 storing the precursor state as a search input state.

14. The method of claim 12 further comprising:
 allowing an operator to designate a state of the selected mobile application as a search results state;
 identifying a precursor state to the operator-designated search results state; and
 storing the precursor state as a search input state.

15. The method of claim 11 wherein:
 the user-visible search indicia includes a textual hint;
 the user-visible search indicia includes a search-specific keyboard;
 the metadata that correlates with search functionality includes a search-specific widget type; and
 the metadata that correlates with search functionality includes an accessibility tag.

16. The method of claim 11 further comprising:
 randomly selecting user interface elements within the selected mobile application for actuation; and
 extracting content and metadata from each state encountered as a result of the actuation of the randomly-selected user interface elements.

17. The method of claim 11 further comprising gathering autocomplete data from text input fields by supplying letters and numbers and scraping autocomplete suggestions.

18. The method of claim 11 wherein the device comprises one of:
 an emulator configured to execute an operating system on emulated hardware, wherein the operating system is selected based on an operating system the selected mobile application was compiled for; and
 a simulator configured to simulate interaction of the operating system with the selected mobile application.

19. The method of claim 11 further comprising downloading the selected mobile application from a digital distribution platform.

20. The method of claim 11 further comprising:
 receiving a query from a user device;
 identifying a set of entity types to describe segments of the query;
 identifying at least one search function record from the stored records, wherein:
  the at least one search function record includes the first search function record, and
  each of the at least one search function record has a set of required input entity types that is a subset of the identified set of entity types;
 executing the first mobile application within a device;
 within the first mobile application on the device, navigating to the search input state of the first search function record according to the navigation path of the first search function record;
 supplying parameters to the search input state based on the parameters specified by the query;
 performing the search function within the first mobile application on the device;
 scraping content from a resulting search results state within the first mobile application on the device;
 assembling the scraped content for each of the at least one search function; and
 transmitting the assembled content to the user device.

* * * * *